US005778396A

United States Patent [19]

Matsuyama

[11] Patent Number: 5,778,396

[45] Date of Patent: Jul. 7, 1998

[54] ELECTRONIC EQUIPMENT SUCH AS AN ELECTRONIC TYPEWRITER HAVING A RELOCATION FUNCTION AND AN EXTENSION FUNCTION THEREOF

[75] Inventor: Shigeru Matsuyama, Yokohama, Japan

[73] Assignee: Canon Kabushiki Kaisha, Tokyo, Japan

[21] Appl. No.: 351,110

[22] Filed: Nov. 30, 1994

Related U.S. Application Data

[63] Continuation of Ser. No. 35,896, Mar. 23, 1993, abandoned, which is a continuation of Ser. No. 381,992, Jul. 17, 1989, abandoned, which is a continuation of Ser. No. 849,285, Apr. 8, 1986, abandoned.

[30] Foreign Application Priority Data

Apr. 12, 1985 [JP] Japan .................................... 60-77788

[51] Int. Cl.[6] .................................... G06F 3/00

[52] U.S. Cl. .............................. 707/500; 400/61; 400/62; 400/63; 345/156

[58] Field of Search .............................. 395/144; 364/709; 400/62, 63, 61; 707/500; 345/156

[56] References Cited

U.S. PATENT DOCUMENTS

| | | | |
|---|---|---|---|
| 3,786,429 | 1/1974 | Goldman et al. | 400/83 |
| 3,872,462 | 3/1975 | Lemelson | 345/25 |
| 4,195,353 | 3/1980 | Abe et al. | 395/148 |
| 4,223,393 | 9/1980 | Abe et al. | 395/148 |
| 4,244,031 | 1/1981 | Izushima et al. | 395/148 |
| 4,247,906 | 1/1981 | Corwin et al. | 395/146 |
| 4,323,315 | 4/1982 | Demonte et al. | 400/63 |
| 4,408,302 | 10/1983 | Fessel et al. | 395/144 |
| 4,437,156 | 3/1984 | Christopher et al. | 364/709.09 |
| 4,561,793 | 12/1985 | Blanchard, Jr. | 400/697.1 |
| 4,627,015 | 12/1986 | Stephens | 395/147 |
| 4,639,151 | 1/1987 | Ueno et al. | 400/63 |
| 4,672,575 | 6/1987 | Stephens | 395/155 |
| 4,695,172 | 9/1987 | Ueno et al. | 400/83 |
| 4,797,855 | 1/1989 | Duncan, IV et al. | 364/919.12 |
| 4,904,099 | 2/1990 | Abe et al. | 400/348 |
| 4,907,900 | 3/1990 | Duncan, IV | 400/63 |
| 5,033,879 | 7/1991 | Abe et al. | 400/61 |

OTHER PUBLICATIONS

Arthur H. Seidman, editor, The Handbook of Computers and Computing, 1984, pp. 659–673, Van Nostrand Reinhold Company, New York.

A.K. Cook et al., IBM Technical Disclosure Bulletin, vol. 18, No. 11, Apr. 1976.

J.S. Coenen, IBM Technical Disclosure Bulletin, vol. 19, No. 8, Jan. 1977.

Gerlach et al., IBM Technical Disclosure Bulletin, vol. 21, No. 11, Apr. 1979.

*Primary Examiner*—Krisna Lim

*Attorney, Agent, or Firm*—Fitzpatrick, Cella, Harper & Scinto

[57] ABSTRACT

Electronic equipment of the invention includes a keyboard for inputting character data, a memory for storing the character data input from the keyboard, a printer for printing the character data stored in the memory, and a display for displaying the memory contents. The memory consists of a buffer for temporarily storing the character data, a cursor pointer indicating a cursor position on the display, an end pointer indicating a position immediately succeeding the position of the last character input from the keyboard, and a head pointer indicating the printing head position of the printer. The keyboard includes a relocation key in addition to various character input keys. When the relocation key is depressed, the cursor is moved to a position indicated by the cursor pointer, and when depressed again, the cursor is moved to the position indicated by the end pointer, thus facilitating correction of input errors.

5 Claims, 3 Drawing Sheets

| PROCEDURE | KEY OPERATION | CURSOR POINTER | END POINTER | HEAD POINTER | BUFFER | DISPLAY | PRINT |
|---|---|---|---|---|---|---|---|
| 1 | POWER ON | 1 | 1 | 1 | | _ | ▭ |
| 2 | I | 2 | 2 | 1 | I | I_ | ▭ |
| 3 | □ | 3 | 3 | 3 | I␣ | _ | I▭ |
| 4 | Was | 6 | 6 | 3 | I␣Was | Was_ | |
| 5 | RELOCATION KEY | 3 | 6 | 3 | I␣Was | W̲as | |
| 6 | w | 4 | 6 | 3 | I␣was | wa̲s | |
| 7 | RELOCATION KEY | 6 | 6 | 3 | I␣was | was_ | |
| 8 | □ | 7 | 7 | 7 | I␣was␣ | _ | I was ▭ |

FIG. 2

ELECTRONIC EQUIPMENT SUCH AS AN ELECTRONIC TYPEWRITER HAVING A RELOCATION FUNCTION AND AN EXTENSION FUNCTION THEREOF

This application is a continuation of application Ser. No. 08/035,896, filed Mar. 23, 1993, now abandoned, which is a continuation of application Ser. No. 07/381,992 filed Jul. 17, 1989, now abandoned, which is a continuation of application Ser. No. 06/849,285 filed Apr. 8, 1986, now abandoned.

BACKGROUND OF THE INVENTION

1. Field of the Invention

The present invention relates to an electronic equipment (e.g., an electronic typewriter) which can correct erroneously entered characters on a display screen, and more particularly, to electronic equipment which has a so-called relocation function and an extension function thereof.

2. Related Background Art

In a conventional electronic typewriter (i.e., electronic equipment), when an operator notices a character (typographical) error during input from a keyboard, he moves a cursor to the input error position by operating a cursor-back key to correct it, and returns the cursor to the cursor position immediately after the last input character by depressing a relocation key. He then continues character input.

In a typewriter which cannot correct characters already printed, printing is performed each time the space key is depressed (i.e., for each word) or a tab key is depressed, and characters input from the keyboard are temporarily stored in a buffer memory until the printing operation is executed. The storage content is displayed on a display device, and the erroneous characters are corrected in the buffer memory.

With the above correction method, if the operator notices an input error immediately, it is more effective to return the cursor to the input error position. However, if he does not discover the error until later (for example, when data to be printed is stored in a buffer upon depression of a space or tab key and the first portion of the storage content contains an input error), it is often more effective to return the cursor to the starting character of a character string stored in the buffer. In other words, since the operator remembers the order in which the character string was input, it is most effective for him to re-enter the character string from the beginning.

SUMMARY OF THE INVENTION

In it an object of the present invention to provide electronic equipment which can convert a value of a cursor pointer into that of a printing head pointer, and then reconvert it.

It is another object of the present invention to provide electronic equipment which can convert a position pointer into a value indicating predetermined character data for a memory.

It is still another object of the present invention to provide electronic equipment which can convert a value of a storage position pointer into a value indicating the starting character of a display.

It is still another object of the present invention to provide electronic equipment which can convert an input position of input character data into data indicated by a printing pointer.

BRIEF DESCRIPTION OF THE DRAWINGS

FIG. 2 is a table showing a key operation procedure of the equipment shown in FIG. 1.

DETAILED DESCRIPTION OF THE PREFERRED EMBODIMENTS

An embodiment of the present invention will be described in detail hereinafter with reference to the accompanying drawings.

Figure 1:
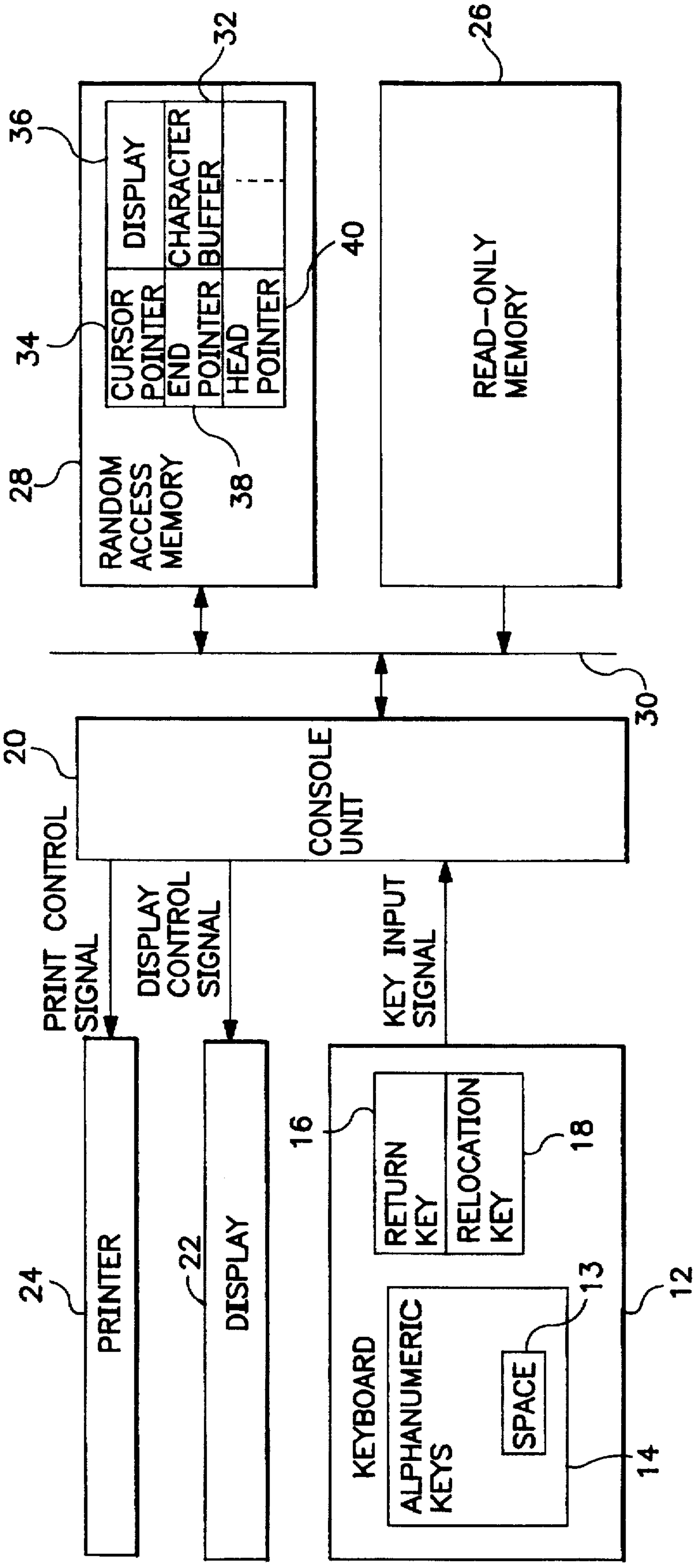
FIG. 1 is a block diagram of electronic equipment according to an embodiment of the present invention.

FIG. 1 shows electronic equipment according to an embodiment of the present invention.

A keyboard 12 comprises alphanumeric keys 14 including keys for inputting letters A to Z, keys for inputting numerals 0 to 9, and keys for inputting punctuation marks (e.g., a space, comma, period, and the like), and a return key 16. In addition, the keyboard KB comprises a relocation key 18, which indicates the correction of characters erroneously input from the keyboard KB and the completion thereof.

A console unit 20 comprises a microprocessor, which is a sequence control circuit including a clock pulse generator, a delay circuit, a gate circuit, and other logic circuits.

A display 22 comprises a dot-matrix type liquid crystal display, and displays characters input from the keyboard 12 under the control of a display control signal from the console unit 20.

A printer 24 (e.g., a serial printer) prints characters or numerals corresponding to a key input signal input from the keyboard 12 on a paper sheet under the control of a print control signal from the console unit 20.

Figure 3:
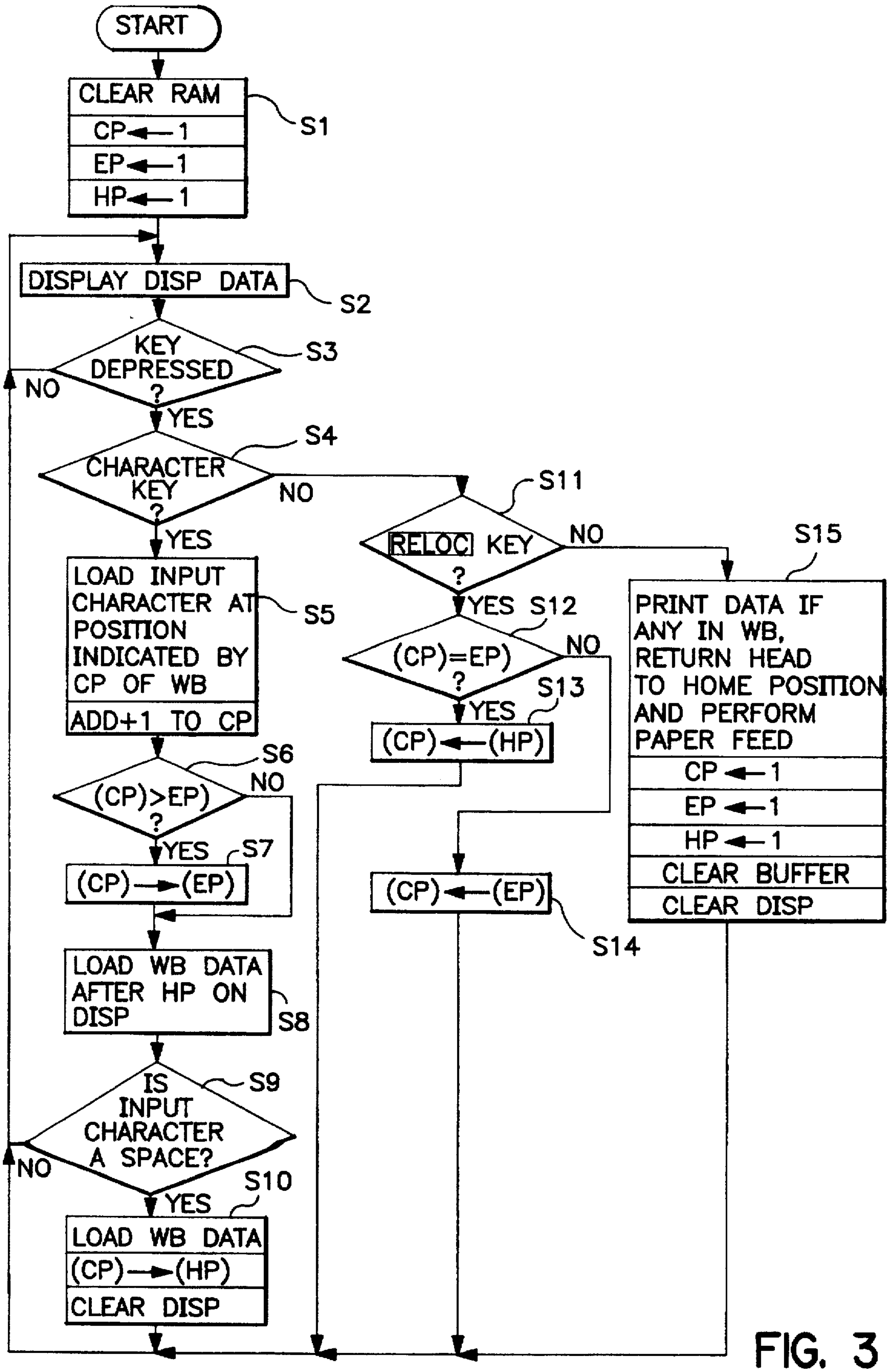
FIG. 3 is a flow chart of a control operation by the key operation.

A read-only memory 26 stores microinstructions necessary for sequentially directing the control procedure shown in FIG. 3 when the console unit 20 supplies control signals to the printer 24 or the display 22.

A rewritable random access memory 28 comprises a region for storing operation states of respective components, a display memory DISPLAY for storing input character data to be displayed, a buffer 32 which can store input characters in units of words, and the like, and a printing position pointer indicating a printing position of printer 24. The printing position of printer 24 is stored in the memory of the printing position pointer in memory 28 .

A bus line 30 electrically connects the console unit 20, the read-only memory 26, and the random access memory 28. Memory addresses and various data are transferred therealong.

The operation of the electronic equipment of the present invention in FIG. 1 will be described with reference to the key operation procedure in FIG. 2 and the flow chart in FIG. 3.

When a power switch (not shown) on the keyboard 12 is turned on in accordance with key-operation procedure 1 in FIG. 2, the console unit 20 clears all the storage regions of the random-access memory 28, and sets "1" in a cursor pointer 34 for storing a cursor position on the display 36, and end pointer 38 indicating the position next to the last character entered from the keyboard 12, and a head pointer 40 indicating the printing head position of the printer 24 in step S1 of the flow chart in FIG. 3. As a result, the console unit 20 acts as an instruction means for instructing the clearing of memory 28 when the power switch is turned on. Thereafter, in steps S2 and S3, the console unit 20 executes a control loop for awaiting a key input from the keyboard 12 while displaying display data from the memory 36 of the random access memory 28.

When the key input signal from a letter key [I] of the keyboard 12 is input in key-operation procedure 2, the console unit 20 checks in decision step S4 of FIG. 3 if the key input signal is a signal upon depression of a character key. Since the key input signal indicates the depression of a letter key, YES is obtained in step S4 and the flow advances to step S5. In step S5, an input character "I" is stored at a position indicated by the content of the cursor pointer 34 of the buffer 32, and the content of the pointer 34 is incremented by +1.

In step S6, data "2" in the cursor pointer 34 is compared with data "1" in the end pointer 38. In this case, since the data in the cursor pointer 34 is larger than that in the end pointer 38, the flow advances to step S7, and the data "2" of the pointer 34 is stored in the end pointer 38. Next, in step S8, data "I", coming after the head pointer in the buffer 32, is loaded in the memory 36, and since the input character is not a space, the flow returns to step S2. The content "I" of the memory 36 is displayed on the display 32, and the key input standby routine in step S3 is then executed.

Thus, the display shown in the column of procedure 2 of FIG. 2 can be seen on the screen of the display 22.

When a space key 13 is depressed in procedure 3, steps S4, S5, S6, S7, S8 and S9 in FIG. 3 are sequentially executed. Since the space key is depressed, data "I" in the buffer 32 is printed by the printer 24, data "3" of the cursor pointer 34 is stored in the head pointer 40, and the memory 36 is cleared. The flow then returns to step S2.

When character keys [W], [a], and [s] are sequentially depressed in procedure 4 and the key input signals indicating these characters are sequentially input, the same control sequence as in procedure 2 is executed, and contents of the pointers 34, 38, and 40, the buffer 32, and the memory 36 are respectively updated to those shown in the columns for procedure 4 in FIG. 2.

When the relocation key 18 of the present invention is depressed in procedure 5, steps S4, S11, and S12 in FIG. 3 are sequentially executed, and in step S12, the values of the pointers 34 and 38 are compared with each other. In this case, since data "6" of the pointer 34 is equal to that of pointer 38, the flow advances to step S13. In step S13, data "3" of the head pointer 40 is set in the cursor pointer 34, and the flow returns to step S2. Then, a display as shown in the display column of procedure 5 in FIG. 2 is made, and the next key input is awaited.

When a character key [w] is depressed in procedure 6, since the same control sequence as in procedure 2 is executed, the storage content of the buffer 32 and the display content of the display 22 are rewritten to correspond to the character key [w] in place of key [W] depressed in procedure 4 (see the respective columns in procedure 6).

When the relocation key 18 is depressed again in procedure 7, steps S4, S11, and S12 in FIG. 3 are sequentially executed. In step S12, since data "4" of the cursor pointer 34 is different from data "6" of the end pointer 38, the flow advances to step S14. Then, the data "6" of the pointer 38 is set in the pointer 34, and the flow returns to step S2. As shown in the column of procedure 7, a display wherein the cursor position is moved to a final input position is made.

When the space key 13 is depressed in procedure 8, the same control sequence as in procedure 3 is performed, and the printing operation is carried out by the printer 24, as shown in FIG. 2.

Thereafter, when the return key 16 is depressed, steps S3, S4, S11, and S15 are sequentially executed, so that the storage content of the buffer 32 is printed by the printer 24 in step S15 and carriage-return and line-feed operations are performed. In addition, "1" is set as the pointers 34, 38, and 40 and the buffer 32 and the memory 36 are cleared.

With this embodiment, when an operator finds an input error and depresses the relocation key 18, the cursor is moved to the head of the buffer 32 (in this case, character "W") to enable correction. When the relocation key 18 is depressed again after the character "W" is replaced with a lower case "w", input is awaited for the character position immediately succeeding the final character stored in the buffer 32 (in this case, character "s"). Therefore, the operator can effectively correct the erroneously input character.

According to the present invention as described above, when a specific key indicating correction of an erroneously input character is depressed, the cursor is moved to a predetermined position (e.g., a starting position) in a character string stored in a storage means. When a specific key indicating completion of correction is depressed after the error is corrected, the cursor is moved to a final input position to enable inputting of new characters. Therefore, correction of input errors can be effectively performed.

Furthermore, according to the present invention, special-purpose keys indicating error correction and completion thereof are arranged at a predetermined position on a keyboard, and operability during the correction operation can be improved greatly.

What is claimed is:

1. Electronic equipment comprising:

input means for inputting character data;

storage means for storing the character data input from said input means;

printing means for printing data;

storage position pointer memory means comprising a memory in said storage means for storing a storage position of the character data input from said input means, said storage position pointer memory means updating the storage position each time said input means inputs the character data;

printing position pointer memory means comprising a memory in said storage means for storing a printing position of said printing means, said printing position pointer memory means updating the printing position each time said printing means prints the character data stored in said storage means;

manual instruction means for changing the storage position stored in said storage position pointer memory means to the printing position stored in said printing position pointer memory means;

end pointer memory means, responsive to an instruction given by said manual instruction means, for storing the storage position in said storage position pointer memory means before the storage position is changed by said manual instruction means;

print instruction means for generating a printing instruction; and control means for causing said storage position pointer memory means to store the printing position of said printing position pointer memory means in response to an instruction by said manual instruction means, and for causing the storage position changed by said manual instruction means to be changed to correspond to the storage position stored in said end pointer memory means in response to a further instruction by said manual instruction means.

2. Equipment according to claim 1, further comprising second instruction means for instructing the restoration of said storage position changed by said manual instruction means to its original value.

3. Equipment according to claim 2, wherein said manual instruction means and said second instruction means both comprise the same key.

4. Electronic equipment comprising:

a keyboard for entering alphabet data;

a memory for storing the alphabet data entered from said keyboard;

a printer for printing alphabet-data-word by alphabet-data-word;

a memory position pointer for storing a memory position of the alphabet data entered from said keyboard, said memory storing the entered alphabet data at a position determined by the stored memory position;

a printing position pointer for storing a printing position of said printer, the printing position indicating a position of the alphabet data stored in said memory from which said printer is to start printing;

manual instruction input means for changing the memory position stored in said memory position pointer to the printing position stored in said printing position pointer;

an end pointer, responsive to an instruction given by said manual instruction input means, for storing the memory position before the memory position is changed by said manual instruction input means, said end pointer storing the memory position as an end position at which said memory stores new character data entered subsequent to the alphabet data already stored;

print instruction input means for generating a printing instruction;

control means for controlling said memory position pointer to change the memory position from an original position to another position in response to an instruction given by said manual instruction input means and to change the memory position from the another position to the original position in response to a further instruction given by said manual instruction input means; and print control means for controlling said printer to print the data stored in said memory means which have not been printed yet in response to the printing instruction input by said print instruction input means.

5. Electronic equipment according to claim 4, wherein said memory, said memory position pointer, said printing position pointer, and said end pointer are provided in the same RAM.

* * * * *

UNITED STATES PATENT AND TRADEMARK OFFICE
CERTIFICATE OF CORRECTION

PATENT NO. : 5,778,396

DATED : July 7, 1998

INVENTORS : SHIGERU MATSUYAMA

It is certified that error appears in the above-identified patent and that said Letters Patent is hereby corrected as shown below:

COLUMN 1:

Line 49, "In it" should read --It is--.

COLUMN 2:

Line 17, "KB" should read --12--.
Line 19, "KB should read --12--.

COLUMN 3:

Line 19, "32" should read --22--.

Signed and Sealed this

Thirty-first Day of August, 1999

Attest:

Q. TODD DICKINSON

Attesting Officer

Acting Commissioner of Patents and Trademarks